Patented Nov. 17, 1953

2,659,737

UNITED STATES PATENT OFFICE 2,659,737

DYESTUFF INTERMEDIATES OF THE ANTHRAQUINONE SERIES

Albin Peter and Erhard Wydler, Basel, Switzerland

No Drawing. Application December 3, 1951, Serial No. 259,696

Claims priority, application Switzerland December 8, 1950

12 Claims. (Cl. 260—374)

The present invention relates to dyestuff intermediates of the anthraquinone series.

It has been found that new dyestuff intermediates of the anthraquinone series of the composition:

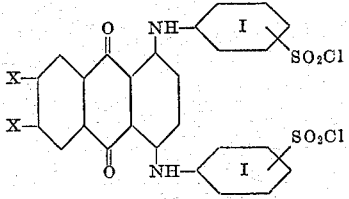

wherein each X stands for a hydrogen, chlorine or bromine atom, and wherein the benzene nuclei I may be further substituted by lower alkyl, lower alkoxy, phenoxy, lower alkyl phenoxy, or halogeno phenoxy groups or halogen atoms, are obtained by the action of chlorosulfonic acid on the corresponding 1,4-diarylaminoanthraquinone derivative of the composition:

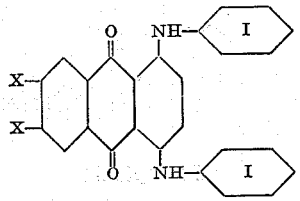

wherein X has the precedingly-recited significance and benzene nuclei I may be unsubstituted or may be substituted as precedingly-indicated and/or may be sulfonated, until the resultant compounds have become soluble in hot dilute alkali metal hydroxide solution, but are still insoluble in water.

Chlorosulfonic acid has heretofore been employed for the sulfonation of arylaminoanthraquinones. However, the products obtained according to the present invention are not sulfonic acids. They are not water soluble; since they contain sulfur and replaceable chlorine, it is clear that they are sulfochlorides.

Suitable initial 1,4-diarylaminoanthraquinones for the purposes of the present invention comprise the following: diarylaminoanthraquinones obtained by the condensation of e. g. 1,4-dihydroxyanthraquinone or its leuco compound with aromatic amines, such for example as aminobenzene, the methyl-aminobenzenes, the chloroaminobenzenes, 2 - methoxy - 1 - aminobenzene, 4-methoxy-1-aminobenzene, 4-ethoxy-1-aminobenzene, 5-methyl-2-methoxy-1-aminobenzene, 4 - n - butyl - 1 - aminobenzene, 2,4 - dimethyl - 1-aminobenzene, 2,5-dimethyl-1-aminobenzene, 2,6-dimethyl-1-aminobenzene, 2,4,6-trimethyl-1-aminobenzene, 6-ethyl-2,4-dimethyl-1-aminobenzene, 2,4,6-triethyl-1-aminobenzene, 2,3,4,6-tetramethyl-1-aminobenzene, 2-(4'-chlorophenoxy)-1-aminobenzene, 4-phenoxy-1-aminobenzene, 4 - (4' - chlorophenoxy) - 1 - aminobenzene, etc.; 1,4'-diarylamino-6-chloro- and -6-bromoanthraquinones obtained for example by the condensation of the corresponding dihydroxy-halogeno-anthraquinones with aromatic amines, such for example as 4-methyl-1-aminobenzene, 2,6-dimethyl - 1 - aminobenzene, 2,4,6 - trimethyl - 1-aminobenzene, etc.; 1,4-diarylamino-6,7-dichloroanthraquinones such for example as 1,4-di - (2',6' - dimethyl) - phenylamino - 6,7 - di - chloro - anthraquinone, 1,4 - di - (2',4',6' - tri - methyl- or -triethyl)-phenylamino-6,7-dichloro-anthraquinone, etc., as well as the sulfonic acids obtained by the action of concentrated and fuming sulfuric acid on the afore-enumerated arylaminoanthraquinones.

In order to prepare the dyestuff intermediates according to the present invention, the starting material is added, while stirring at a temperature between —10° C. and +100° C., to chlorosulfonic acid and the stirring continued within the said temperature range until a test specimen is found to be insoluble in water but soluble in hot dilute alkali metal hydroxide solution.

The reaction product is then poured onto ice or onto a mixture of ice and water or salt water, and the formed precipitate filtered off and washed with water or salt water (aqueous sodium chloride solution). The product may be used as a moist paste, but if desired it may be dehydrated by careful drying, preferably under reduced pressure and at a low temperature, for example room temperature (about 20° C.).

The new intermediates of the present invention can be condensed with amines to provide valuable compounds which are useful as lacquer dyestuffs, pigment dyestuffs and also as dyestuffs for textile fibers.

The following examples set forth representative exemplary embodiments of the invention, and these examples are intended to be solely illustrative and not at all limitative. In these examples, the parts and percentages are by weight and the temperatures are expressed in degrees centigrade.

*Example 1*

220 parts of chlorosulfonic acid are preheated to 40°. Thereupon, while stirring thoroughly, 23.7 parts of 1,4-di-(2',4',6'-trimethyl)-phenyl-amino-anthraquinone are introduced into the chlorosulfonic acid within a period of 2 hours. Stirring is continued at the same temperature until a test specimen is completely soluble in boiling aqueous sodium hydroxide solution of 2% strength, but remains undissolved when stirred in cold water. This condition is attained in about 2 hours.

The reaction mass is then poured as a thin stream into a powerfully stirred mixture of 1500 parts of ice and 500 parts of aqueous sodium chloride solution of 20% strength. The precipitate is filtered off and washed neutral with ice water.

The product dissolves in benzene with a blue coloration which is more reddish than that of the starting material; it dissolves in ethylacetate with red-violet coloration. Sulfur determination shows that the starting material has taken up two sulfochloride groups.

The intermediate corresponds to the composition:

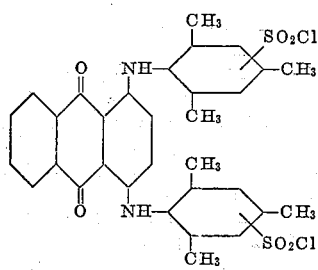

By replacing the 1,4-di-(2',4',6'-trimethyl)-phenylamino-anthraquinone by the corresponding quantity of 1,4-di-(6'-ethyl-2',4'-dimethyl)-phenylamino-anthraquinone and otherwise proceeding in the aforedescribed manner, a similar product of the composition:

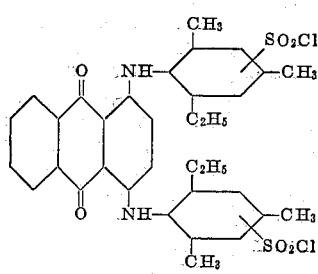

is obtained.

*Example 2*

22.3 parts of 1,4-di-(2',6'-dimethyl)-phenyl-amino-anthraquinone are added in small portions during a period of 1½ hours to 118 parts of chlorosulfonic acid at 50–55°. Thereupon stirring is continued for 3½ additional hours. At the end of this period, a test specimen is completely soluble in hot aqueous sodium hydroxide solution of 2% strength but is insoluble in cold water. The reaction mass is poured onto a stirred mixture of 1000 parts of ice and 500 parts of water, the separated precipitate is filtered off with suction and washed with ice-cold water. Analysis of the product shows it to be a disulfochloride. The intermediate corresponds to the composition:

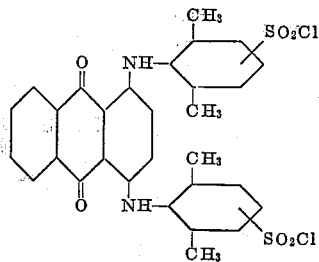

*Example 3*

223 parts of 1,4-di-(2',4'-dimethyl)-phenyl-amino-anthraquinone are added, in the course of 1 hour, to 1500 parts of chlorosulfonic acid at 0°. The mixture is then warmed up to 20°, stirred for 20 hours at this temperature, and then the reaction brought to completion by stirring for 4 hours at 40°. The product corresponds in solubility to the conditions described in Examples 1 and 2. It is isolated by pouring the reaction mixture into a stirred mixture of 10,000 parts of ice and 2500 parts of aqueous potassium chloride solution of 20% strength, followed by suction filtration and washing to neutrality.

Determination of the sulfur and chlorine content of the product agrees with the calculated values for a disulfochloride.

The intermediate thus obtained corresponds to the composition:

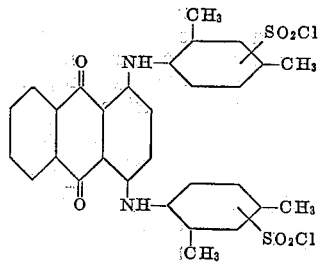

*Example 4*

176 parts of chlorosulfonic acid are cooled to 0° and thereupon 22.3 parts of 1,4-di-(2',5'-dimethyl)phenylamino-anthraquinone are added in small portions within a period of 45 minutes. After removal from the cooling bath, the mixture is warmed to 20° in about one hour; stirring is continued for 3 more hours at this temperature until the sulfochlorination is complete. The mixture is then poured, while stirring, onto 1000 parts of finely-divided ice, and the formed precipitate filtered off and washed neutral. Analysis shows the product to contain 2 sulfochloride groups.

By replacing the 1,4-di-(2',5'-dimethyl)-phenylamino-anthraquinone by an equivalent quantity of 1,4-di-(2'-methoxy-5'-methyl)-phenylamino-anthroquinone and otherwise proceeding as aforedescribed, a similar product results.

The intermediates thus obtained correspond respectively to the compositions:

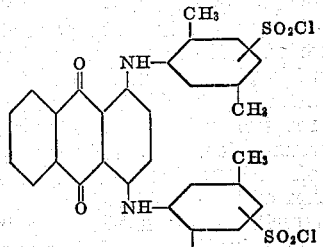

and

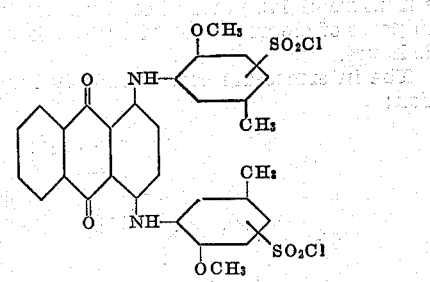

Example 5

28 parts of 1,4-di-(2',4',6'-triethyl)-phenylamino-anthraquinone are added, at 40° and while stirring, to 264 parts of chlorosulfonic acid. Stirring is continued at the same temperature for 20 hours, and finally for 22 hours at 60°. A test specimen of the reaction product is now practically completely soluble in boiling aqueous sodium hydroxide solution of 2% strength, but does not dissolve upon being stirred in cold water. The reaction mass is then poured onto a stirred mixture of 1200 parts of ice and 800 parts of potassium chloride solution of 15% strength. The precipitate is filtered off and washed neutral with ice water.

The intermediate thus obtained is a disulfochloride derivative of the composition:

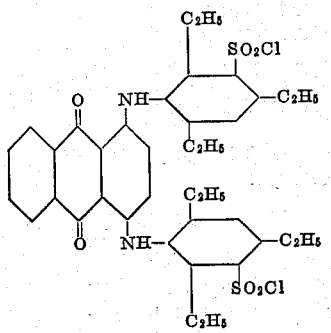

Example 6

5 parts of 1,4-di-(2',3',4',6'-tetramethyl)-phenylaminoanthraquinone are introduced at 40° into 45 parts of chlorosulfonic acid. The reaction mixture is stirred for 4 hours at 40°, then for 16 hours at 50°, and finally for 30 hours at 70°. A test specimen will then behave in cold water and in sodium hydroxide solution of 2% strength in the manner indicated in Example 5. The reaction product is isolated by pouring the reaction mixture onto a stirred mixture of 150 parts of ice and 50 parts of aqueous potassium chloride solution of 20% strength, followed by filtration of the precipitate and washing of the latter to neutrality with ice-cold water. The precipitate is then dried under reduced pressure at 20°. Chlorine determination shows it to be a disulfochlorinated product.

The thus-obtained intermediate corresponds to the composition:

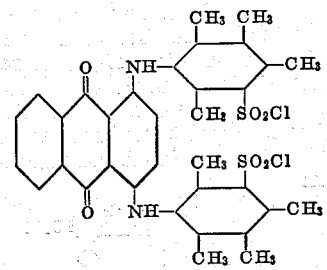

Example 7

200 parts of chlorosulfonic acid are preheated to 70°, whereupon 26 parts of 1,4-di-(2'-chloro)-phenylaminoanthraquinone are stirred in within a period of 2 hours. After stirring has been continued at this temperature for 17 hours, the reaction product is completely soluble in boiling aqueous sodium hydroxide solution of 2% strength. The reaction product does not however dissolve when a test specimen thereof is stirred into cold water. The reaction mixture is poured in the form of a thin stream into a stirred mixture of 1000 parts of ice and 300 parts of water. The separated precipitate is filtered off and washed neutral.

The intermediate thus obtained corresponds to the composition:

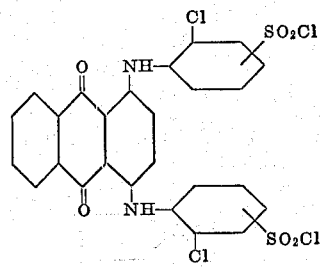

Example 8

26 parts of 1,4-di-(4'-chloro-)phenylaminoanthraquinone are introduced at 85–90° into 180 parts of chlorosulfonic acid, and the mixture stirred for 30 hours. The reaction is thereupon complete. The produced disulfochlorinated product is isolated by precipitation in a stirred mixture of 800 parts of ice and 200 parts of aqueous potassium chloride solution of 20% strength, followed by filtration and washing to neutrality. Analyses for sulfur and chlorine content correspond to the calculated values.

The thus-obtained intermediate corresponds to the composition:

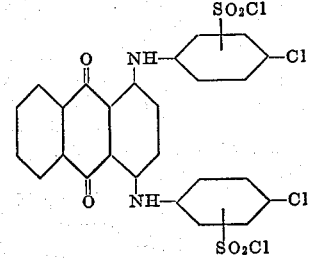

Example 9

22.5 parts of 1,4-di-(2'-methoxy)-phenylaminoanthraquinone are dissolved at 0–5° in 170 parts of chlorosulfonic acid. Stirring is continued at the aforesaid temperature for 21 hours, and then the reaction product is worked up by pouring the reaction mass into a stirred mixture of 900 parts of ice and 200 parts of water, followed by filtration and washing to neutrality. The test specimen of the resultant product dissolves completely when boiled in an aqueous sodium hydroxide solution of 2% strength, on the other hand, it is insoluble in cold water. Analysis shows that two sulfo-chloride groups have added onto the starting material.

The obtained intermediate corresponds to the composition:

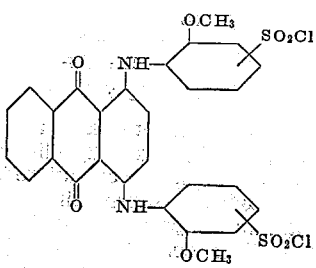

*Example 10*

Within a period of one and one-half hours and at a temperature of 50°, 20.9 parts of 1,4-di-(2'-methyl)-phenylamino-anthraquinone are added to 150 parts of chlorosulfonic acid. After stirring for 2 more hours at this temperature, the reaction product is soluble in boiling dilute aqueous sodium hydroxide solution, but remains undissolved when stirred in cold water. The reaction mixture is poured onto a stirred mixture of 700 parts of ice, 100 parts of water and 40 parts of potassium chloride. The resulting precipitate is then filtered off and washed neutral. It is dried under reduced pressure at 20°.

The thus-obtained intermediate corresponds to the composition:

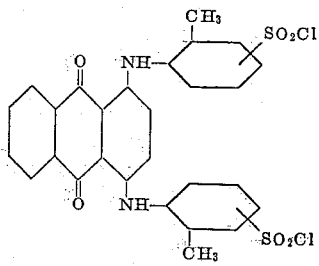

*Example 11*

5 parts of 1,4-di-(2',4',6'-trimethyl)-phenyl-amino-6-chloro-anthraquinone are stirred for 21 hours at 60° in 26 parts of chlorosulfonic acid. The behavior of a test specimen toward hot aqueous sodium hydroxide solution and toward cold water shows that the reaction has been completed. The reaction mass is thereupon poured onto a stirred mixture of 120 parts of ice and 50 parts of aqueous sodium chloride solution of 20% strength, and the resultant precipitate is filtered off and washed neutral with ice water.

The resultant intermediate corresponds to the composition:

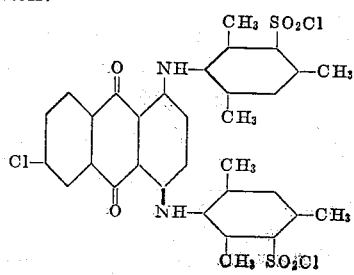

*Example 12*

27.2 parts of 1,4-di-(2',4',6'-trimethyl)-phenyl-amino-6,7-dichloro-anthraquinone are introduced within a period of 1½ hours and at a temperature of 40° into 210 parts of chlorosulfonic acid, stirring is continued for 4½ additional hours, and then the reaction mixture is poured onto 1330 parts of crushed ice. The separated precipitate is filtered off with suction and is washed neutral. The addition of 2 sulfochloride groups onto the starting material is demonstrated by analysis.

The sulfochlorination can also be carried out in a mixture of 176 parts of chlorosulfonic acid and 27 parts of oleum (25%) at 60° within a period of 20 hours.

The intermediate corresponds to the composition:

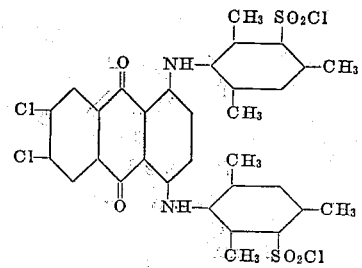

*Example 13*

Into 220 parts of chlorosulfonic acid at 0°, 25.8 parts of 1,4-di-(2',6'-dimethyl)-phenylamino-6,7-dichloro-anthraquinone are added within a period of 45 minutes, whereafter stirring is continued for 4 hours at 35–40°. A test specimen of the reaction product is now found to be soluble when boiled in aqueous sodium hydroxide solution, but insoluble in cold water; this precipitate can be extracted with ethyl acetate.

The reaction mass is then poured onto 1400 parts of ice, the formed precipitate separated by filtration and washed neutral.

Instead of 220 parts of chlorosulfonic acid, use may be made of a mixture of 110 parts of chlorosulfonic acid and 50 parts of sulfuric acid monohydrate.

The intermediate here obtained corresponds to the composition:

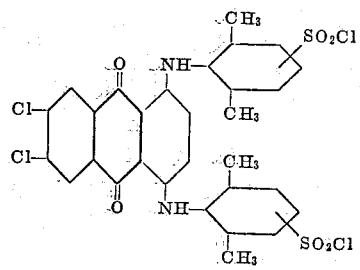

*Example 14*

25.8 parts of 1,4-di-(2',4'-dimethyl)-phenyl-amino-6-chloro-anthraquinone are introduced at 40° into 220 parts of chlorosulfonic acid, and the mixture thereafter stirred for 22 hours at this temperature. Disulfochlorination is then completed. The reaction product is recovered by pouring the reaction mixture into a stirred mixture of 1200 parts of ice and 60 parts of potassium chloride, followed by filtration and washing to the neutrality. Analysis of the product establishes the presence of two sulfochloride groups.

The 1,4-di-(2',4'-dimethyl)-phenylamino-6-chloro-anthraquinone may be replaced by an equivalent amount of the 6-bromo analogue, whereby a similar product results.

The thus-prepared intermediates correspond respectively to the compositions:

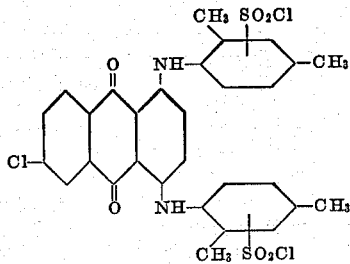

and

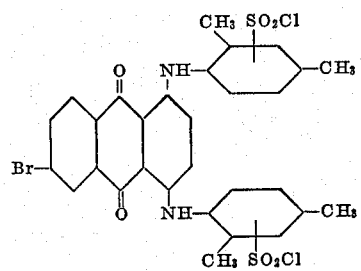

*Example 15*

3.14 parts of 1,4-di-(2',4',6'-triethyl)-phenylamino-6,7-dichloro-anthraquinone are stirred for 40 hours at 70° in 17.6 parts of chlorosulfonic acid. A test specimen of the reaction product is then completely soluble in boiling aqueous sodium hydroxide solution of 2% strength. The reaction mixture is then poured onto a stirred mixture of 150 parts of ice and 50 parts of aqueous sodium chloride solution of 20% strength, and the precipitate which is thrown down is separated by filtration and is washed neutral.

The thus-produced intermediate corresponds to the composition:

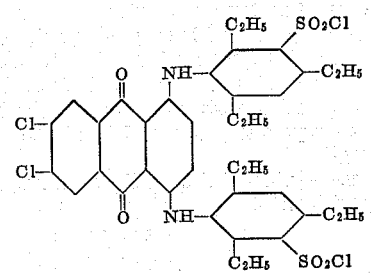

*Example 16*

100 parts of chlorosulfonic acid are preheated to 40°, and 10.4 parts of 1,4-di-(4'-chloro-2'-methoxy)-phenylamino-anthraquinone added thereto within a period of 45 minutes. Stirring is continued for 30 additional hours, whereupon a test specimen dissolves completely when boiled in aqueous sodium hydroxide solution of 2% strength. After pouring the reaction mixture onto 700 parts of ice while stirring, the precipitated reaction product is filtered off and washed neutral.

The thus-obtained intermediate corresponds to the formula:

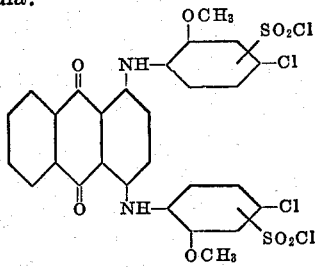

*Example 17*

21.4 parts of 1,4-di-[2'-(4''-chloro)-phenoxy]-phenylamino-anthraquinone are introduced at 0° into 140 parts of chlorosulfonic acid. After stirring for 2½ hours at the said temperature, a test specimen of the reaction mixture is practically completely soluble in boiling aqueous sodium hydroxide solution of 2% strength. The reaction product undergoes no change in properties, even if subjected to the action of ice-cold chlorosulfonic acid for 20 additional hours. The reaction mixture is poured onto a stirred mixture of 750 parts of ice and 250 parts of aqueous potassium chloride solution of 18% strength. The formed precipitate is then filtered off and washed neutral. Analysis confirms the presence of a disulfochloride.

The intermediate thus corresponds to the composition:

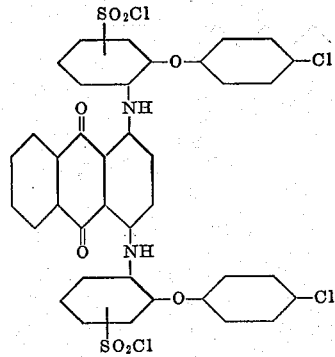

*Example 18*

10 parts of the sodium salt of 1,4-di-(2',4',6'-trimethyl - 3' - sulfo) - phenylamino - anthraquinone, obtained by sulfonation of the corresponding dyestuff base with oleum, are introduced at 17–18° within a period of 40 minutes into 50 parts of chlorosulfonic acid, and then the reaction mixture is stirred for 16 hours at the said temperature. At the end of this time, a test specimen is completely insoluble in cold water but dissolves when boiled in aqueous sodium hydroxide solution of 2% strength. The reaction product corresponds in its behavior to that of Example 1.

The thus-produced disulfochloride, corresponding to the composition:

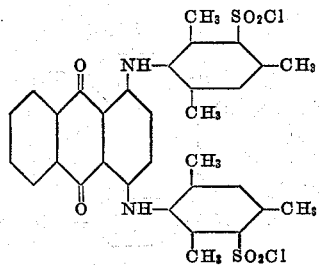

is recovered by pouring the reaction mixture onto a stirred mixture of 150 parts of ice and 50 parts of saturated aqueous sodium chloride solution, followed by filtering off the separated precipitate and then washing the latter with aqueous sodium chloride solution of 10% strength.

Example 19

5 parts of 1,4-diphenylamino-anthraquinone are added in the course of 35 minutes and at a temperature of 0-2° to 35 parts of chlorosulfonic acid, and thereupon the temperature in the cooling bath is raised to 20° within 24 hours. Stirring is thereupon continued for 18 hours at first at room temperature (approximately 20°), whereby the product which is initially completely soluble in cold water becomes progressively less soluble therein. Finally, the mass is heated to 40° for one more hour, whereupon a product is obtained which is insoluble in water but which is completely soluble in aqueous sodium hydroxide solution of 2% strength. The product is recovered by pouring the reaction mixture into a stirred mixture of 100 parts of ice and 40 parts of aqueous sodium chloride solution of 25% strength, filtering off the separated precipitate and then washing the latter neutral.

The thus-obtained intermediate corresponds to the composition:

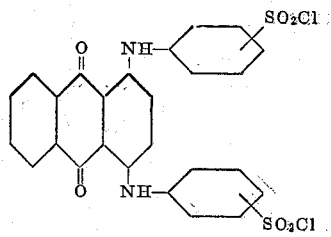

Example 20

350 parts of chlorosulfonic acid are cooled with ice to a temperature of 0-1°, and then 52 parts of 1,4 - di - (4' - methyl) - phenylamino - anthraquinone are carefully added in the course of a half hour. The mixture is allowed to warm up to 18° within a period of 22 hours; the reaction product is then completely soluble in cold water. Stirring is continued for 16 hours at 20-22° and then for a further 1½ hours at 60°, whereupon a water-insoluble product results. This new product is completely soluble in boiling aqueous sodium hydroxide solution of 2% strength.

The product is isolated by pouring the reaction mixture, while stirring, onto 1000 parts of ice and 200 parts of potassium chloride solution of 20% strength. The thus precipitated reaction product is filtered off and washed to neutrality with aqueous sodium chloride solution of 10% strength.

The intermediate which is thus obtained corresponds to the composition:

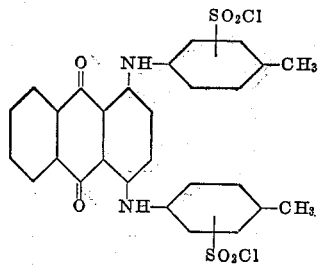

Example 21

113 parts of 1,4-di-(4'-methoxy)-phenyl-aminoanthraquinone are introduced into 528 parts of chloro-sulfonic acid at 15-17° in the course of one hour. The reaction mixture is stirred for 14 more hours; it is then heated in the course of 1 hour up to 40° and this temperature is maintained constant for an additional 1½ hours. A test specimen is then insoluble in cold water, but dissolves completely when boiled in aqueous sodium hydroxide solution of 2% strength. The reaction mixture is poured, while stirring, onto 1000 parts of ice and 500 parts of aqueous sodium chloride solution of 25% strength. The formed precipitate is filtered off and washed with aqueous sodium chloride solution of 10% strength until neutrality is achieved.

The intermediate corresponds to the composition:

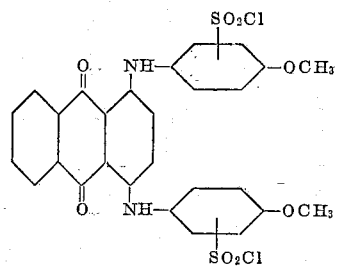

Example 22

10 parts of the sodium salt of 1,4-di-(sulfonic acid-4'-methyl)-phenyl - amino - anthraquinone, prepared by sulfonation of the corresponding dyestuff base in oleum, are added in the course of a half hour to 35 parts of chlorosulfonic acid at 20°. The temperature is then raised to 40° within a period of 2 hours and is maintained constant for 21 hours. Finally, stirring is continued for 6 more hours at 60°, whereupon the initially water-soluble product becomes water-insoluble, dissolving only upon being boiled in aqueous sodium hydroxide solution of 2% strength.

The reaction product is isolated by pouring the reaction mixture carefully onto a stirred mixture of 100 parts of ice and 40 parts of aqueous sodium chloride solution of 26% strength, followed by filtration of the precipitate which is thrown down and washing of the latter to neutrality with aqueous sodium chloride solution of 10% strength.

The thus-obtained intermediate corresponds to the composition:

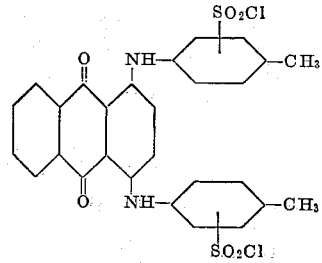

Example 23

10 parts of 1,4-di-(4'-n-butyl)-phenylamino-anthraquinone are added, at 20° and within the course of 1 hour, to 50 parts of chlorosulfonic acid. After further stirring for 15 hours, the mass is heated for 2 more hours to 40°. The reaction product is then insoluble in aqueous sodium chloride solution of 10% strength. It dissolves gradually when stirred in cold water, and goes quickly into solution when stirred with cold aqueous sodium hydroxide solution of 2% strength.

The reaction product is allowed to flow slowly into a stirred mixture of 120 parts of ice and 60 parts of aqueous sodium chloride solution of 20% strength. The separated precipitate is filtered off and washed with aqueous sodium chloride solution of 10% strength.

The intermediate corresponds to the composition:

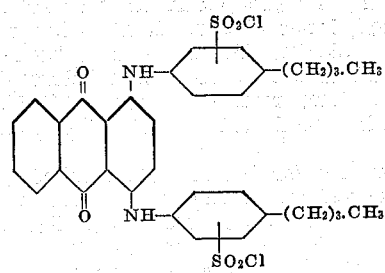

*Example 24*

5.7 parts of 1,4-di-(4'-phenoxy)-phenylamino-anthraquinone are added in the course of half an hour to 26 parts of chlorosulfonic acid at a temperature of 16–18°. After stirring for 1 hour at 19–20°, the material is almost completely water soluble. Stirring is continued under the same conditions for 16 more hours, and there is thus obtained a water-insoluble product which, however, is completely soluble upon heating in aqueous sodium hydroxide solution of 2% strength.

The reaction mixture is poured in the form of a thin stream into a vigorously stirred mixture of 240 parts of ice and 140 parts of sodium chloride solution of 26% strength. The precipitate thus formed is separated by filtration, and is washed neutral with ice-cold aqueous sodium chloride solution of 10% strength.

The thus-obtained intermediate corresponds to the composition:

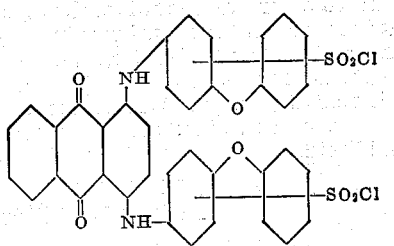

*Example 25*

6.4 parts of 1,4-di-[4'-(4''-chloro)-phenoxyl]-phenylamino-anthraquinone are added within ½ hour at 16–18° to 26 parts of chlorosulfonic acid. The mixture is then stirred further at 19–21°, whereupon at the end of 1 hour the reaction product is insoluble in cold water, and is difficultly soluble in boiling aqueous sodium hydroxide solution of 2% strength. After 16 hours stirring at the said temperature, however, the reaction product is insoluble in cold water, but is completely soluble in boiling aqueous sodium hydroxide solution of 2% strength.

The product which corresponds to the composition:

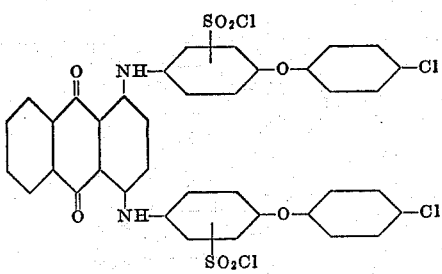

is recovered by pouring the reaction mixture onto a mixture of 240 parts of ice and 240 parts of aqueous potassium chloride solution of 20% strength, followed by filtering off the formed precipitate and washing the latter with ice-cold aqueous potassium chloride solution of 10% strength.

*Example 26*

334 parts of a 20% paste of the disulfochloride of Example 1 from 2,4-di-(2',4',6'-trimethyl)-phenylamino-anthraquinone are stirred with 180 parts of a 20% solution of the sodium salt of 2-aminoethane-sulfonic acid, the mixture being maintained for 3 hours at 50° after the addition of 20 parts of sodium bicarbonate and 100 parts of isopropanol (80%). The reaction mixture, which has thus become water-soluble, is refluxed for 2 more hours at 80°, 80 parts of sodium chloride are added, the mixture stirred cold, filtered, and the thus-isolated acid dyestuff—which dyes wool, silk and nylon in vivid reddish-blue shades of good fastness properties—washed neutral with aqueous sodium chloride solution of 10% strength, and dried.

Having thus disclosed the invention, what is claimed is:

1. A dyestuff intermediate of the anthraquinone series, which corresponds to the formula

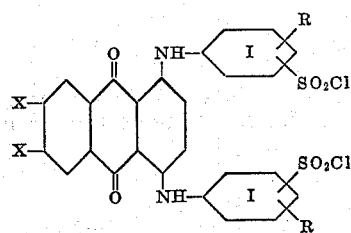

wherein X stands for an atom selected from the group consisting of hydrogen, chlorine and bromine, and wherein R represents a member selected from the group consisting of hydrogen, lower alkyl, lower alkoxy, phenoxy, lower alkyl phenoxy, halogeno phenoxy groups and halogen atoms.

2. The dyestuff intermediate of the anthraquinone series corresponding to the formula

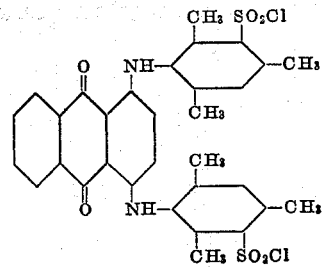

3. The dyestuff intermediate of the anthraquinone series corresponding to the formula

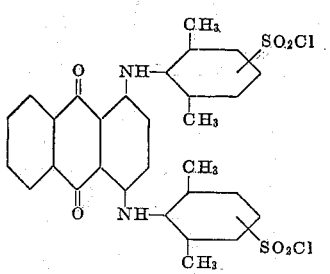

4. The dyestuff intermediate of the anthraquinone series corresponding to the formula

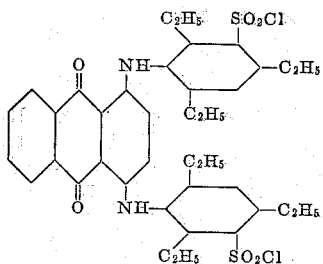

5. The dyestuff intermediate of the anthraquinone series corresponding to the formula

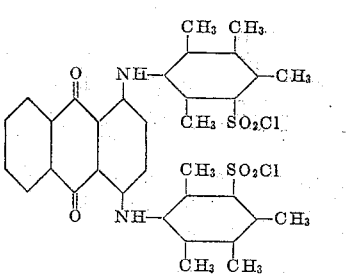

6. The dyestuff intermediate of the anthraquinone series corresponding to the formula

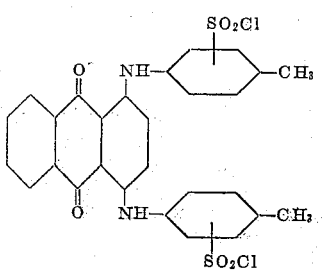

7. A process for the manufacture of a dyestuff intermediate of the anthraquinone series, comprising the step of treating a 1,4-diarylaminoanthraquinone corresponding to the formula

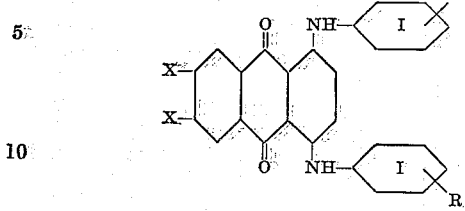

wherein X stands for an atom selected from the group consisting of hydrogen, chlorine and bromine, and wherein R represents a member selected from the group consisting of hydrogen, lower alkyl, lower alkoxy, phenoxy, lower alkyl phenoxy, halogeno phenoxy and sulfonic acid groups and halogen atoms, with chlorosulfonic acid at a temperature between —10° C. and +100° C. in a medium consisting of an excess of said acid.

8. A process for the manufacture of a dyestuff intermediate of the anthraquinone series consisting in the step of treating 1,4-di-(2',4',6'-trimethyl) - phenylamino - anthraquinone with chlorosulfonic acid at a temperature between —10° C. and +100° C. in a medium consisting of an excess of said acid.

9. A process for the manufacture of a dyestuff intermediate of the anthraquinone series consisting in the step of treating 1,4-di-(2',6'-dimethyl) - phenylamino - anthraquinone with chlorosulfonic acid at a temperature between —10° C. and +100° C. in a medium consisting of an excess of said acid.

10. A process for the manufacture of a dyestuff intermediate of the anthraquinone series consisting in the step of treating 1,4-di-(2',4',6'-triethyl) - phenylamino - anthraquinone with chlorosulfonic acid at a temperature between —10° C. and +100° C. in a medium consisting of an excess of said acid.

11. A process for the manufacture of a dyestuff intermediate of the anthraquinone series consisting in the step of treating 1,4-di-(2',3',4',6'-tetramethyl)-phenylamino - anthraquinone with chlorosulfonic acid at a temperature between —10° C. and +100° C. in a medium consisting of an excess of said acid.

12. A process for the manufacture of a dyestuff intermediate of the anthraquinone series consisting in the step of treating 1,4-(sulfo-4'-methyl)-phenylamino-anthraquinone with chlorosulfonic acid at a temperature between —10° C. and +100° C. in a medium consisting of an excess of said acid.

ALBIN PETER.
ERHARD WYDLER.

References Cited in the file of this patent
UNITED STATES PATENTS

| Number | Name | Date |
|---|---|---|
| 2,121,928 | Peter | June 28, 1938 |
| 2,377,145 | Gutzwiller | May 29, 1945 |